United States Patent Office 3,297,694
Patented Jan. 10, 1967

3,297,694
DIALKYLAMINOALKYLAMINO AMIDES OF 3-PHENYLCINNOLINE-4-CARBOXYLIC ACIDS
Harman S. Lowrie, Glenview, Ill., assignor to G. D. Searle & Co., Chicago, Ill., a corporation of Delaware
No Drawing. Filed July 13, 1964, Ser. No. 382,377
6 Claims. (Cl. 260—247.2)

The present invention relates to complex amides of 3-phenylcinnoline-4-carboxylic acids. In particular, it relates to a group of compounds which can be represented by the following general formula

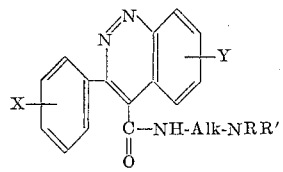

wherein X and Y are selected from the group consisting of hydrogen, methyl, methoxy, and halogen; Alk is a lower alkylene radical separating the nitrogens attached thereto by at least 2 carbon atoms; and —NRR' is selected from the group consisting of di(lower alkyl)-amino, 1-pyrrolidinyl, piperidino, morpholino, and 4-methyl-1-piperazinyl. The halogens referred to above include fluorine, chlorine, bromine, and iodine. The lower alkylene radicals referred to above contain up to 6 carbon atoms and can be exemplified by ethylene, propylene, trimethylene, and tetramethylene. The lower alkyl radicals referred to above likewise contain up to 6 carbon atoms and can be exemplified by methyl, ethyl, propyl, butyl, and the like.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention are conveniently prepared from the appropriate 3-phenylcinnoline-4-carboxylic acid. Such compounds are readily converted to the corresponding acid chloride by known means. Thionyl chloride has been found to be satisfactory for this purpose for the type of compounds involved here. The resultant acid halide, preferably the chloride, is then reacted with the appropriate dialkylaminoalkylamine to give the amides of the present invention. The intermediate carboxylic acids referred to above are either themselves known or can readily be prepared by the same procedures used to prepare the known compounds.

The compounds of the present invention are useful because of their pharmacological properties. In particular, they are useful as hypotensive agents. The compounds also possess anti-inflammatory activity which is demonstrated by their phenylbutazone-like effect on edematous conditions. In addition, the present compounds possess anti-biotic activity against a variety of organisms. Thus, they inhibit the growth of bacteria such as *Diplococcus pneumoniae* and protozoa such as *Tetrahymena gelleii*. In addition, they inhibit germination of seeds of Trifolium.

The following examples are presented to further illustrate the invention; they should not be construed as limiting it in spirit or in scope. In these examples, quantities are indicated in parts by weight unless parts by volume are specified, and temperatures in degrees centigrade (° C.). The relationship between parts by weight and parts by volume is the same as that between grams and milliliters.

Example 1

A solution of 120 parts of 4-chlorobenzaldehyde phenylhydrazone in 1070 parts of methylene chloride is added portionwise to a refluxing solution of 76 parts of oxalyl chloride in 1600 parts of methylene chloride with stirring. Stirring and refluxing is continued for about 2 hours after hydrogen chloride gas is no longer evolved. Then, 228 parts of aluminum chloride is added portionwise and stirring is continued at room temperature for 15 hours. The resultant dark red reaction mixture is poured into 4000 parts by volume of ice and water and the resultant solution is diluted with methylene chloride to a volume of 11,000 parts. The resultant mixture is then washed twice with 10% hydrogen chloride and once with water. The methylene chloride solution is dried over sodium sulfate and concentrated under reduced pressure. The solid which precipitates is separated by filtration and recrystallized from ethanol to give N-(4-chlorobenzylideneamino)isatin melting at about 237–238° C.

5 parts of the isatin obtained in the preceding paragraph is refluxed for about 5 minutes in about 100 parts by volume of 50% potassium hydroxide solution. The suspension which results is then diluted to 500 parts by volume with boiling water and treated with charcoal. The filtered solution is acidified to a pH of 4 with concentrated hydrochloric acid. The resultant mixture is cooled and the light powder which forms is filtered off and dried. The product thus obtained is recrystallized from acetone to give 3-(4-chlorophenyl)cinnoline-4-carboxylic acid melting at about 210–211° C.

If the above procedure is repeated starting with anisaldehyde phenylhydrazone there is first obtained N-(4-methoxybenzylideneamino)isatin which has a melting point of 173–175° C. after recrystallization from ether. This is then converted to 3-(4-methoxyphenyl)-cinnoline-4-carboxylic acid which melts at about 249–250° C. after recrystallization from acetic acid.

Example 2

A solution of 30 parts of 3-phenylcinnoline-4-carboxylic acid and 330 parts of thionyl chloride is refluxed for 2 hours and then allowed to stand at room temperature for 15 hours. Volatile materials are evaporated from the reaction mixture under reduced pressure and the resultant residue is stirred with ether to give a yellow powder which is separated by filtration and dried. The material thus obtained is crude 3-phenylcinnoline-4-carbonyl chloride and it is used without further purification.

In a similar manner, 3-(4-chlorophenyl)cinnoline-4-carboxylic acid is converted to 3-(4-chlorophenyl)cinnoline-4-carbonyl chloride and 3-(4-methoxyphenyl)cinnoline-4-carboxylic acid is converted to 3-(4-methoxyphenyl)cinnoline-4-carbonyl chloride.

Example 3

A solution of 5.4 parts of crude 3-phenylcinnoline-4-carbonyl chloride in 67 parts of methylene chloride is added portionwise to a solution of 3 parts of 3-dimethylaminopropylamine and 3 parts of pyridine in 200 parts of chloroform. The mixture warms slightly from the heat of reaction but it is allowed to stand at room temperature for 15 hours. The mixture is then further diluted with methylene chloride, washed with dilute potassium carbonate solution, and dried, and the solvent is evaporated under reduced pressure. The resultant residue is suspended in ether and then extracted with dilute hydrochloric acid. The acid solution is then stirred with charcoal, filtered, and made alkaline, and the alkaline solution is extracted with methylene chloride. The methylene chloride solution is dried and concentrated and hexane is added until a cloudy solution is obtained. On cooling, this gives N-(3-dimethylaminopropyl)-3-phenylcinnoline-4-carboxamide melting at about 127–128° C. This compound has the following formula

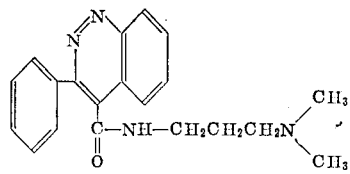

*Example 4*

The procedure described in Example 3 is repeated using 2.8 parts of 2-dimethylaminoethylamine in place of the 3 parts of 3-dimethylaminopropylamine. The product is isolated from the reaction mixture in the same manner and the crude material is recrystallized from a mixture of ether and pentane. The material thus obtained is N-(2-dimethylaminoethyl) - 3 - phenylcinnoline-4-carboxamide melting at about 137–139° C.

In the same manner, if 3-(4-chlorophenyl)cinnoline-4-carbonyl chloride is reacted with 2-dimethylaminoethylamine, there is obtained N-(2-dimethylaminoethyl)-3-(4-chlorophenyl)cinnoline-4-carboxamide.

Likewise, the reaction 3-(4-methoxyphenyl)cinnoline-4-carbonyl chloride with 2-dimethylaminoethylamine gives N - (2 - dimethylaminoethyl)-3-(4-methoxyphenyl)cinnoline-4-carboxamide.

*Example 5*

A solution of 5.4 parts of 3-phenylcinnoline-4-carbonyl chloride in 67 parts of methylene chloride is added to a solution of 6.5 parts of 4-(2-aminoethyl)morpholine in 267 parts of methylene chloride. The resultant mixture is allowed to stand for 2 days before it is further diluted with methylene chloride and then washed with dilute potassium carbonate solution and dried. The solvent is evaporated from the mixture under reduced pressure and the resultant residue is stirred with ether to cause it to crystallize. The solid thus obtained is separated by filtration and recrystallized from a mixture of acetone and hexane to give N-(2-morpholinoethyl)-3-phenylcinnoline-4-carboxamide as yellow needles melting at about 130–131° C. This compound has the following formula

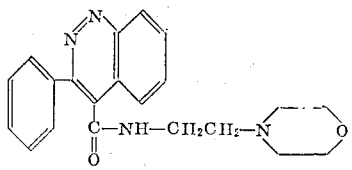

*Example 6*

The procedure described in Example 5 is repeated using 5.7 parts of 2-dipropylaminoethylamine in place of the 6.5 parts of 4-(2-aminoethyl)morpholine. The crude product is isolated from the mixture in the same manner. It is recrystallized first from a mixture of ether and hexane and then from hexane to give N-(2-dipropylaminoethyl)-3-phenylcinnoline-4-carboxamide melting at about 109–110°. This compound has the following formula

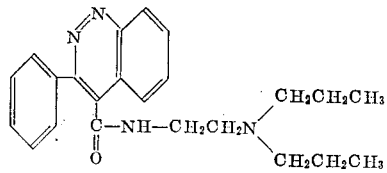

*Example 7*

A mixture of 5.4 parts of 4-chloro-3-phenyl-cinnoline and 10 parts of 1-(3-aminopropyl)-4-methyl-piperazine in 270 parts of methylene chloride is allowed to stand for 2 days. The resultant mixture is diluted with methylene chloride, washed with dilute potassium hydroxide solution, and extracted with dilute hydrochloric acid. The acid extract is made alkaline and the resultant alkaline mixture is extracted with methylene chloride. The methylene chloride solution is dried and the solvent is evaporated under reduced pressure. The residue which is obtained is then crystallized from acetone to give N - [3 - (4 - methyl - 1 - piperazinyl)propyl] - 3 - phenylcinnoline-4-carboxamide melting at about 179–180° C. This compound has the following formula

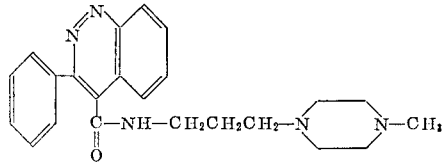

*Example 8*

If an equivalent quantity of 1-(2-aminoethyl)-piperidine is substituted for the 4-(2-aminoethyl)-morpholine and the procedure described in Example 5 is repeated there is obtained N-(2-piperidinoethyl)-3-phenylcinnoline-4-carboxamide.

Likewise, if an equivalent quantity of 1-(2-aminoethyl)pyrrolidine is substituted for the 4-(2-aminoethyl)-morpholine and the procedure of Example 5 is repeated there is obtained N-[2-(1-pyrrolidinyl)ethyl]-3-phenylcinnoline-4-carboxamide.

What is claimed is:

1. A compound of the formula

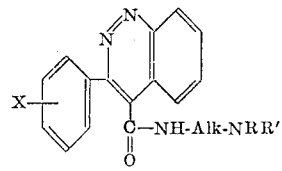

wherein X is selected from the group consisting of hydrogen, methoxy, and chlorine; Alk is lower alkylene separating the nitrogens attached thereto by at least 2 carbon atoms; and —NRR' is selected from the group consisting of di(lower alkyl)amino, 1-pyrrolidinyl, piperidino, morpholino, and 4-methyl-1-piperazinyl.

2. A compound of the formula

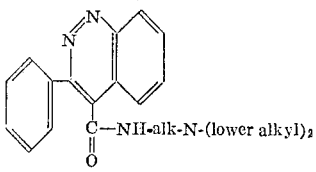

wherein Alk is lower alkylene separating the nitrogens attached thereto by at least 2 carbon atoms.

3. N - (3 - dimethylaminopropyl) - 3 - phenylcinnoline-4-carboxamide.

4. N - (2 - dipropylaminoethyl) - 3 - phenylcinnoline-4-carboxamide.

5. N - (2 - morpholinoethyl) - 3 - phenylcinnoline-4-carboxamide.

6. N - [3 - (4 - methyl - 1 - piperazinyl)propyl] - 3-phenylcinnoline-4-carboxamide.

References Cited by the Examiner

UNITED STATES PATENTS 3,239,525   3/1966   Lowrie _____ 260—250

OTHER REFERENCES

Castle et al.: J. Org. Chem. vol. 26, pages 2374–78, May–August. (1961).

ALEX MAZEL, *Primary Examiner.*

J. TOVAR, *Assistant Examiner.*